(12) United States Patent
Toong et al.

(10) Patent No.: US 7,890,062 B2
(45) Date of Patent: Feb. 15, 2011

(54) FAST CORRECTION OF POWER MEASUREMENTS OF SIGNALS HAVING A CHANGING FREQUENCY

(75) Inventors: Fook Shian Toong, Penang (MY); Eric Breakenridge, Clackmannanshire (GB)

(73) Assignee: Agilent Technologies, Inc., Santa Clara, CA (US)

( * ) Notice: Subject to any disclaimer, the term of this patent is extended or adjusted under 35 U.S.C. 154(b) by 538 days.

(21) Appl. No.: 12/032,648

(22) Filed: Feb. 16, 2008

(65) Prior Publication Data
US 2009/0209209 A1  Aug. 20, 2009

(51) Int. Cl.
*H04B 17/00* (2006.01)

(52) U.S. Cl. .............. 455/67.15; 455/67.11; 455/67.13; 455/67.7; 455/68; 455/115.4; 455/226.4; 375/132; 375/136; 375/137; 324/76.19; 324/76.22; 324/76.24

(58) Field of Classification Search .............. 455/67.11, 455/67.13, 67.15, 67.7, 68, 423–425, 115.1–115.4, 455/226.1–226.4; 375/132–137; 324/76.19, 324/76.22, 76.24
See application file for complete search history.

(56) References Cited

U.S. PATENT DOCUMENTS

| | | | |
|---|---|---|---|
| 5,801,525 A | 9/1998 | Oldfield et al. | |
| 7,292,618 B2 * | 11/2007 | Tal et al. | 375/132 |
| 7,292,625 B2 * | 11/2007 | Hsu | 375/222 |
| 7,626,919 B2 * | 12/2009 | Miyoshi et al. | 370/208 |
| 7,701,997 B2 * | 4/2010 | Tal et al. | 375/132 |
| 7,738,529 B2 * | 6/2010 | Horiguchi | 375/133 |
| 2004/0190652 A1 * | 9/2004 | Gamble et al. | 375/344 |

OTHER PUBLICATIONS

William F. Egan, "Frequency Synthesis by Phase Lock", "Speed-Up Circuits", Copyright 1999, 476-480, Second Edition, publisher: John Wiley & Sons, USA.

* cited by examiner

*Primary Examiner*—Tuan A Tran
(74) *Attorney, Agent, or Firm*—Marc Bobys

(57) ABSTRACT

Power measurements of a signal having a changing frequency are corrected by acquiring samples of the signal, matching the samples of the signal to a sequence of frequencies indexed to correction transforms, and applying the correction transforms to the samples of the signal. Additionally, an apparatus corrects power measurements of a signal having a changing frequency and includes an acquisition block for acquiring samples of the signal, a sequence controller for matching the samples of the signal to a sequence of frequencies indexed to correction transforms and a correction block for applying the correction transforms to the samples of the signal.

20 Claims, 4 Drawing Sheets

FAST CORRECTION OF POWER MEASUREMENTS OF SIGNALS HAVING A CHANGING FREQUENCY

BACKGROUND OF THE INVENTION

Power meters require the user to select a carrier frequency before making power measurements. This frequency setting is mapped to a correction factor that is be applied to all subsequent power measurements. A typical graph 100 showing correction or calibration factor 101 versus frequency 103 is shown in FIG. 1. The graph 100 is for a 8481A thermocouple sensor from Agilent Technologies, Inc. of Santa Clara, Calif., USA. Modern diode power sensors, such as those used to characterize pulsed RF systems, require even more complex measurement corrections. These can vary considerably over frequency and make the selection of the proper carrier frequency even more important.

Frequency hopping signals have existed for many years. Frequency hopping moves, or hops, the carrier frequency of a signal between an upper and lower frequency range a number of times per second. This tends to spread out the signal's spectrum over that frequency range. Frequency hopping provides resistance to jamming and low probability of intercept which is useful in military radar and communication applications.

One current communication standard that makes use of frequency hopping is Bluetooth. Bluetooth has 79 channels each 1 MHz wide and hops from one channel to another in a pseudorandom manner 1600 times per second. Frequency hopping is also used in cordless phones following the WDCT standard and the HomeRF standard which provides for a broader range of interoperable consumer devices.

When using a power meter to measure frequency hopping signals, due to the nature of the signal which hops its carrier frequency within a range of frequencies, the measurement will have error if the frequency of the power meter is set to a single value. Average responding thermal sensors will not show too much degradation in accuracy. They will, however only report the average power of the transmission as it hops through all frequencies.

A bigger problem is encountered when the power at each frequency in the hopping sequence has to be checked. Even with fast pulse trains, some power meters have the capability to capture and analyze every pulse in a pulse train. Due to the complexity of the applied corrections there has been only one set of frequency corrections applied and thus, if all pulses are captured, there is an uncertainty added due to the wrong frequency correction being applied. One solution has been to set the power meter to the desired frequency and delay the acquisition until the point in the hopping sequence when that frequency is transmitted. This is repeated until the measurements at all desired frequencies are completed. However, this solution is very slow as it requires that the sequence be repeated N times in order to measure the power at all N frequencies in the sequence.

In addition to signal types that are designed to be hopping there is also the common component test scenario where the test signal is stepped through a sequence of frequencies. This type of testing is often used to measure the gain of amplifiers, for example, as a function of frequency. These test scenarios suffer from problems similar to those of frequency hopping signals as in both scenarios obtaining the results is slow or the accuracy is compromised.

SUMMARY OF THE INVENTION

The present invention provides fast frequency correction of power measurements for frequency hopping signals or more generally for signals having changing frequency.

In general terms, power measurements of a signal having a changing frequency are calibrated by acquiring samples of the signal, matching the samples of the signal to a sequence of frequencies indexed to correction transforms, and applying the correction transforms to the samples of the signal. Additionally, an apparatus calibrates power measurements of a signal having a hopping carrier frequency and includes an acquisition block for acquiring samples of the signal, a sequence controller for matching the samples of the signal to a sequence of frequencies indexed to correction transforms and a correction block for applying the correction transforms to the samples of the signal.

BRIEF DESCRIPTION OF THE DRAWINGS

Further preferred features of the invention will now be described for the sake of example only with reference to the following figures, in which.

DETAILED DESCRIPTION

Figure 2:
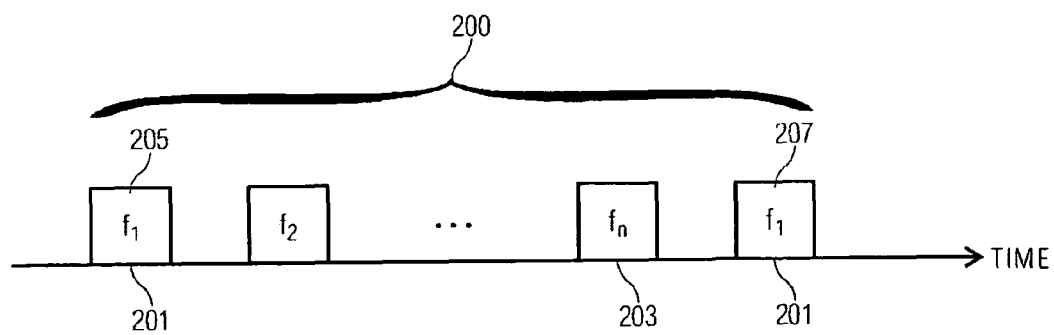
FIG. 2 shows a typical frequency hopping signal as a function of time as its frequency cycles through the hopping sequence.

FIG. 2 shows pulses 205 through 207 of a typical frequency hopping signal 200 as a function of time as its frequency cycles through the hopping sequence from a first carrier frequency f1 201 to a carrier frequency fn 203 and back again to f1 201.

Figure 3:
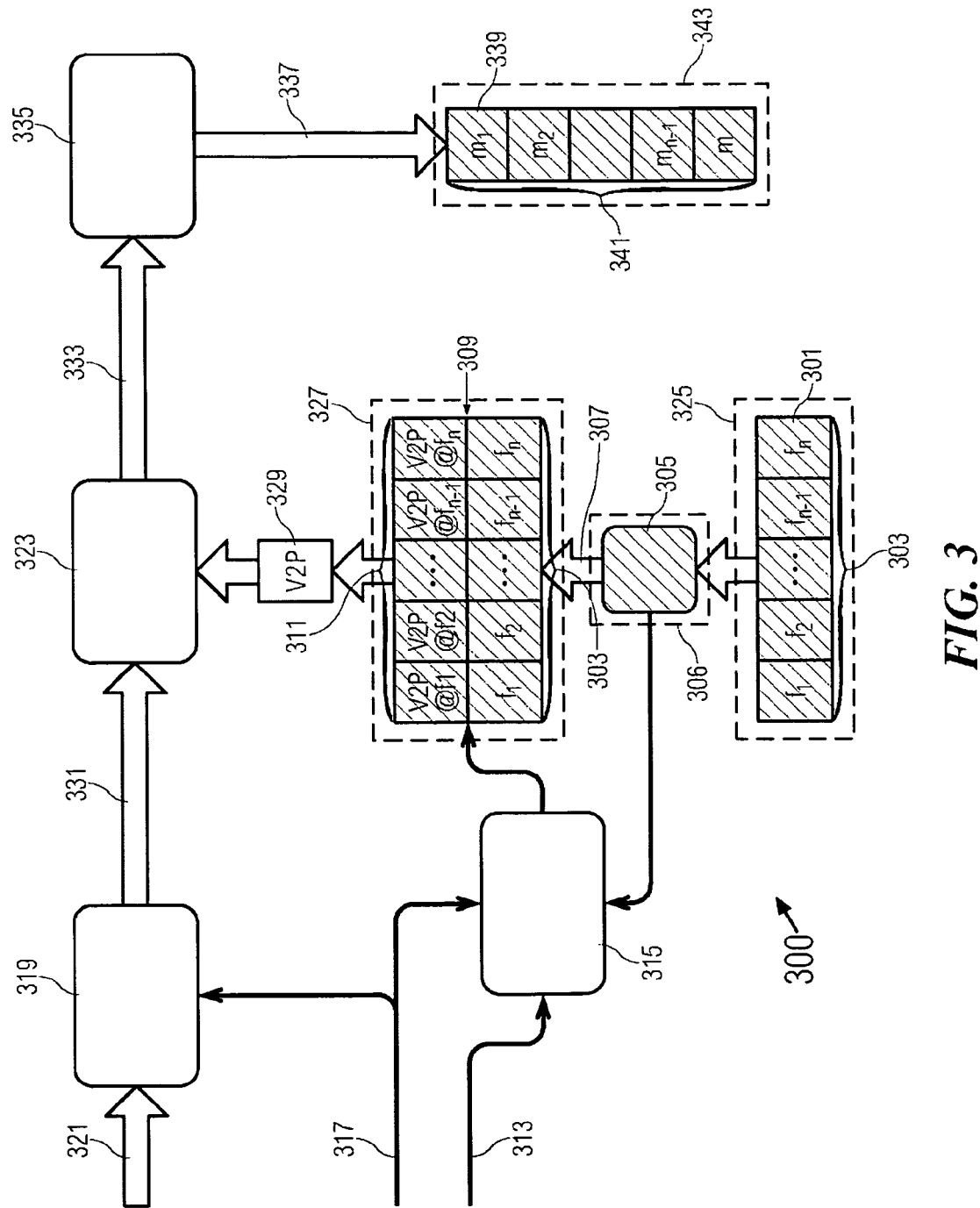
FIG. 3 is a diagrammatic block diagram showing a power measurement system having fast correction of power measurements of an embodiment of the present invention.

FIG. 3 is a diagrammatic block diagram showing a power measurement system having fast correction of power measurements 300 of an embodiment of the present invention.

Figure 4:
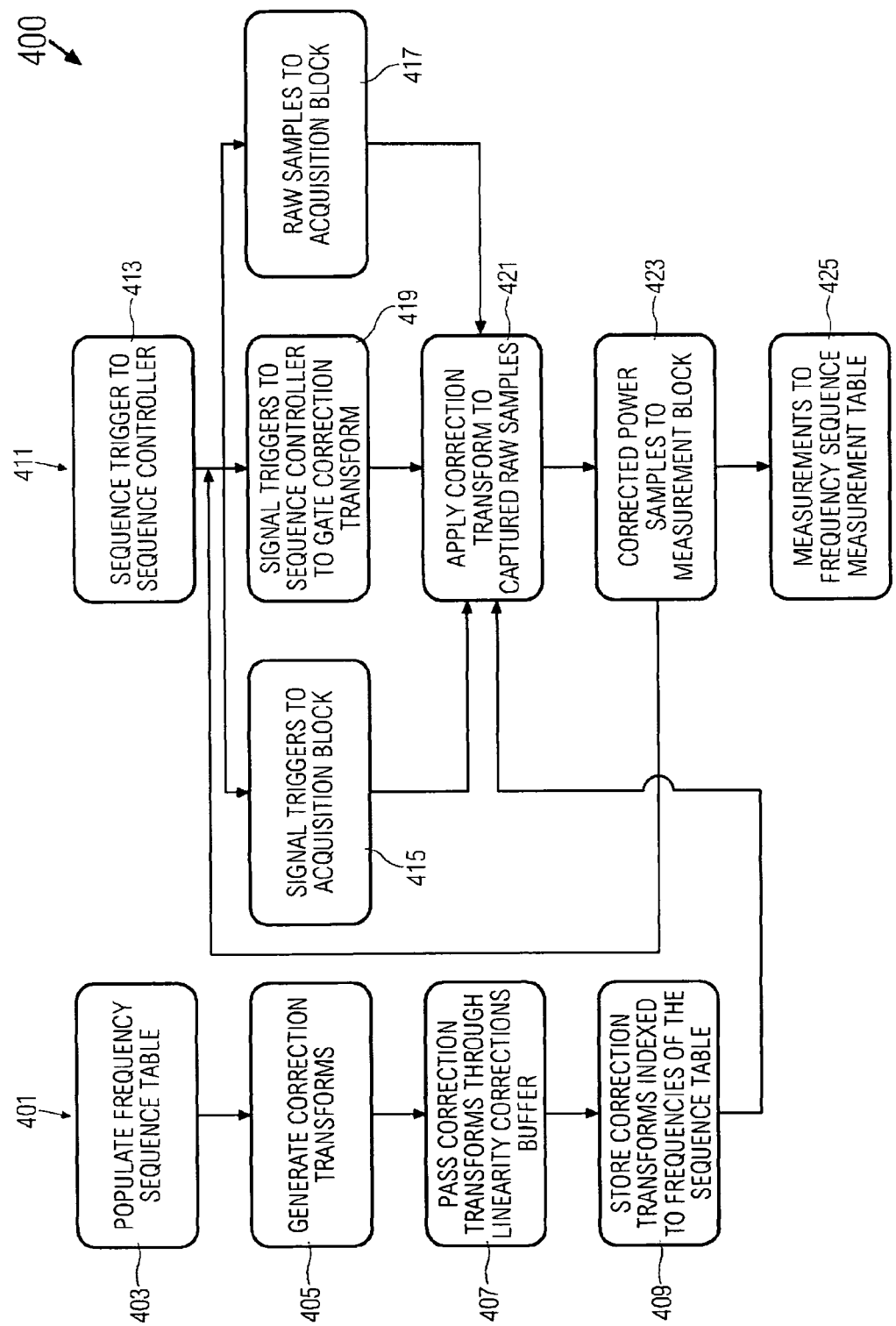
FIG. 4 is a flowchart illustrating a calibrated power measurement method for using the power measurement system having fast correction of power measurements of FIG. 3.

FIG. 4 is a flowchart illustrating a calibrated power measurement method 400 for using the power measurement system having fast correction of power measurements 300 of FIG. 3. The first steps of the method 400 provide a correction transform generation method 401. At STEP 403 a frequency sequence table 301 is populated by a user based on a user's knowledge of the hopping sequence of the frequency hopping signal 200. In other words, the sequence of frequencies can be known ahead of time based on the predetermined hopping sequence of the hopping carrier frequency. The sequence of frequencies stored in the sequence table is thus also predetermined depending on the predetermined or fixed sequence of the frequency hopping signal 200. Alternatively, the frequency sequence table 301 can be populated automatically or semi-automatically. The signal 200 has "n" channels, hopping from one to another, (e.g. from the channels ranging from carrier frequencies f1 201 to fn 203) and returning to the first channel f1 201 after the nth hop at the frequency fn 203. Values for the hopping frequencies 303 (i.e. from f1 to fn) are stored in the frequency sequence table 301.

More generally the signal can have any type of changing frequency. For example, as described above in the testing used to measure the gain of amplifiers as a function of frequency. In general the values of the changing frequencies can be used to populate the frequency sequence table 301 to practice the present invention.

Figure 1:
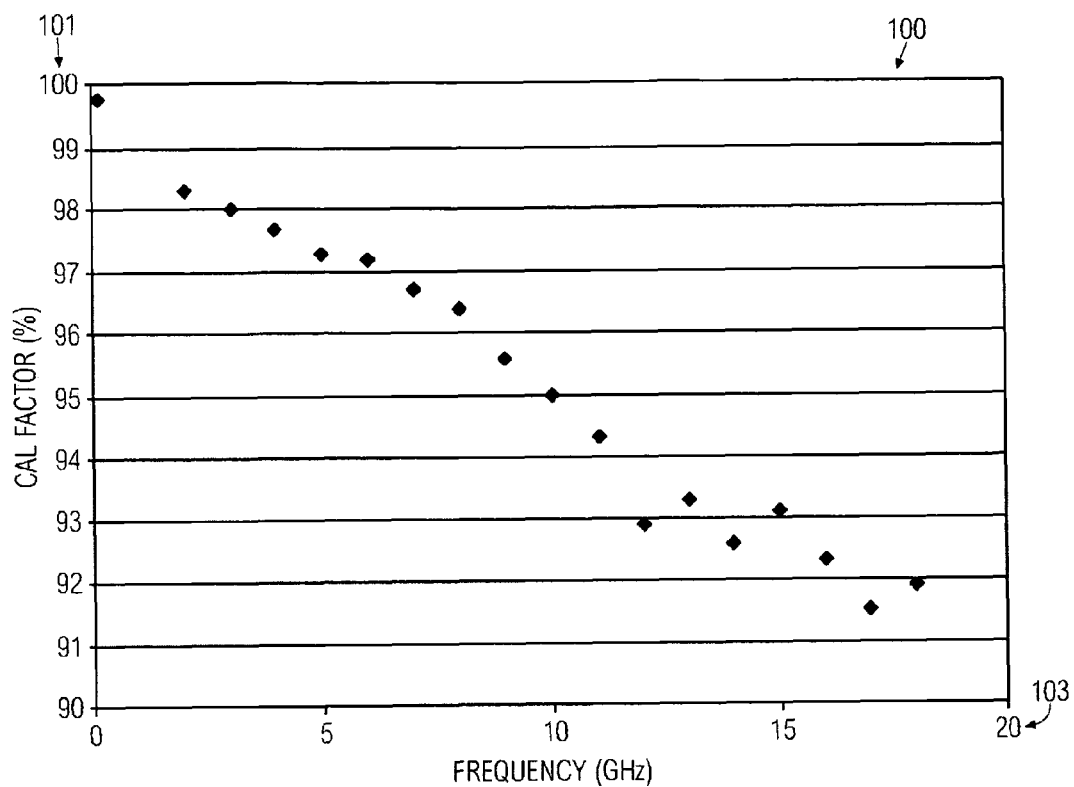
FIG. 1 shows a typical graph of calibration factor versus frequency.

At STEP 405 a correction transform section 305 generates a correction transform for each of the frequencies 303 stored in the sequence table 301. The correction transforms can be generated either through manipulation of calibration data or from the evaluation of functions derived to model the calibration data. The correction transform can be the simple calibration factors 101 of FIG. 1. These calibration factors are numerical values that represents the ratio between the sensor output voltage at a particular frequency and sensor output voltage at a calibrating frequency, given the same input power at both frequencies. The calibration factors vary at different frequencies and can be expressed as a percentage, with 100% corresponding to the calibration factor at the calibration frequency. This will generate a linear transformation of voltage to power.

For some sensor types the transformation is non-linear and the process is often referred to as linearity correction. This linearity correction may vary with frequency hence the need for linearity correction at each of the frequencies in the hop sequence.

More generally, the voltage to power transform (or V2P@f in abbreviated form) at a given frequency is a function of the applied power and the sensor temperature. So for a given frequency and temperature a look up table can be generated (the table made up of "correction transforms") by the correction transform section 305 to convert the voltage to power.

At STEP 405 the arm signal 308 can be sent to a sequence controller 315 to allow the sequence controller to ignore trigger events (the sequence trigger 313 and "signal" triggers 317 described below) until the tables are all in place.

The correction transform section 305 can be a CPU 306 or other processor, for example.

At STEP 407 the correction transforms are passed to a correction transform storage table 309 by passing them through a linearity corrections buffer 307. The linearity corrections buffer is the store of linearity corrections. In many power meters the linearity correction is performed through the use of a look-up table, so in that case the linearity corrections buffer has all the look-up tables for the sequence of frequencies.

At STEP 409 a full set of correction transforms 311 is stored in the transform storage table 309. The correction transforms 311 are indexed to the frequencies 303 of the sequence table 301.

Further steps provide a trigger, acquisition and correction method 411.

At STEP 413 the sequence of power measurements is initialized by a sequence trigger 313 fed into the sequence controller 315. The sequence trigger 313 synchronizes the selection of the frequency values 303 to incoming raw samples 321. The raw samples 321 can be the voltage output by a sensor in response to receiving the power the pulses 205 through 207 forming the frequency hopping signal 200 of FIG. 2, for example. The sequence trigger can come from the user. A control command can be issued at the start of a measurement or from an external signal that is synchronous with the start of the hopping sequence. Alternatively it can be the first signal trigger that comes along after the correction transforms are set up.

At STEP 415 subsequent "signal" triggers 317 gate the acquisition of the raw samples 321 through an acquisition block 319. The signal triggers come from either an external signal synchronous with the signal pulses or from the signal transitioning through a supplied threshold. The sequence trigger is synchronous with the hopping sequence while the signal trigger is synchronous with the signal pulses. At STEP 417 the raw samples 321 are acquired by the acquisition block 319. Captured raw samples 331 are then output from the acquisition block 319 to a correction block 323.

At STEP 419 the subsequent "signal" triggers 317 are also fed into the sequence controller 315 to gate a correction transform 329 (selected from one of the correction transforms 311 corresponding to one of the stored frequencies 303) into the correction block 323. Upon each of the subsequent "signal" triggers 317, the next frequency value 303 for the next element in the frequency sequence table 301 is selected. The next correction transform 311 corresponding to the next frequency value 303 is also fed into the correction block 323.

At STEP 421 the correction block 323 applies the correction transform 329 corresponding to the frequency of a captured raw sample 331 in order to correct the captured raw sample 331 to provide corrected power samples 333. For example, when the captured raw samples 331 are samples of voltage measurements output by a power sensor, the correction block 323 can apply the voltage-to-power correction transform 329 that will convert the voltage measurement to a power measurement and correct for frequency dependency of the sensor measurements at the particular frequencies of the pulses 205 to produce corrected power samples 333. These corrected power samples 333 are the desired measurement for the particular sample. The "signal" triggers 317 assure the correspondence of the frequencies 303 of the acquired raw samples 321 and the selection of the correction transforms 311 indexed to those frequencies 303.

At STEP 423 the corrected power samples 333 are output from the correction block 323 to a measurement block 335. The measurement block converts the corrected power samples 333 into the desired output measurement format. For example, a user may require data in the form of the average power in the pulse, in which case the measurement block would sum all the samples and divide by the number of samples. Similarly the user may desire the peak in the pulse or the average power in just the middle part of the pulse, for example. The measurement block 335 performs these calculations for converting the corrected power samples 333 to the desired output data format of measurements 337. The measurement block 335 outputs the measurements 337 to a frequency sequence measurement table 339.

At STEP 425, as the frequency sequence 303 is stepped through, so the frequency sequence measurement table 339 is built up from the measurements 337 to fill-in the measurement table 339. Once the sequence is complete the user can retrieve the set of measurements 337 from the table 339.

The embodiment 300 has a measurement rate dictated by the rate at which the correction transforms 311 can be selected and applied to the captured raw sample 331 as illustrated by the cross-hatched blocks. Because of the pre-calculation there is no slow down. This means that in the embodiment 300 the frequency correction can be performed with no degradation in the measurement rate. This invention allows the frequency to be quickly changed without slowing down the measurement speed.

The frequency sequence table 301 can be stored on a computer readable media 325, the transform storage table 309 can be stored on a computer readable media 327 and the measurement table 339 can be stored on a computer readable media 343. The media 325, 327, 343 can be solid state storage, hard drives or any other data storage known in the art. The media 325, 327, 343 can be together on a larger combined media or can be separate.

Figure 5:
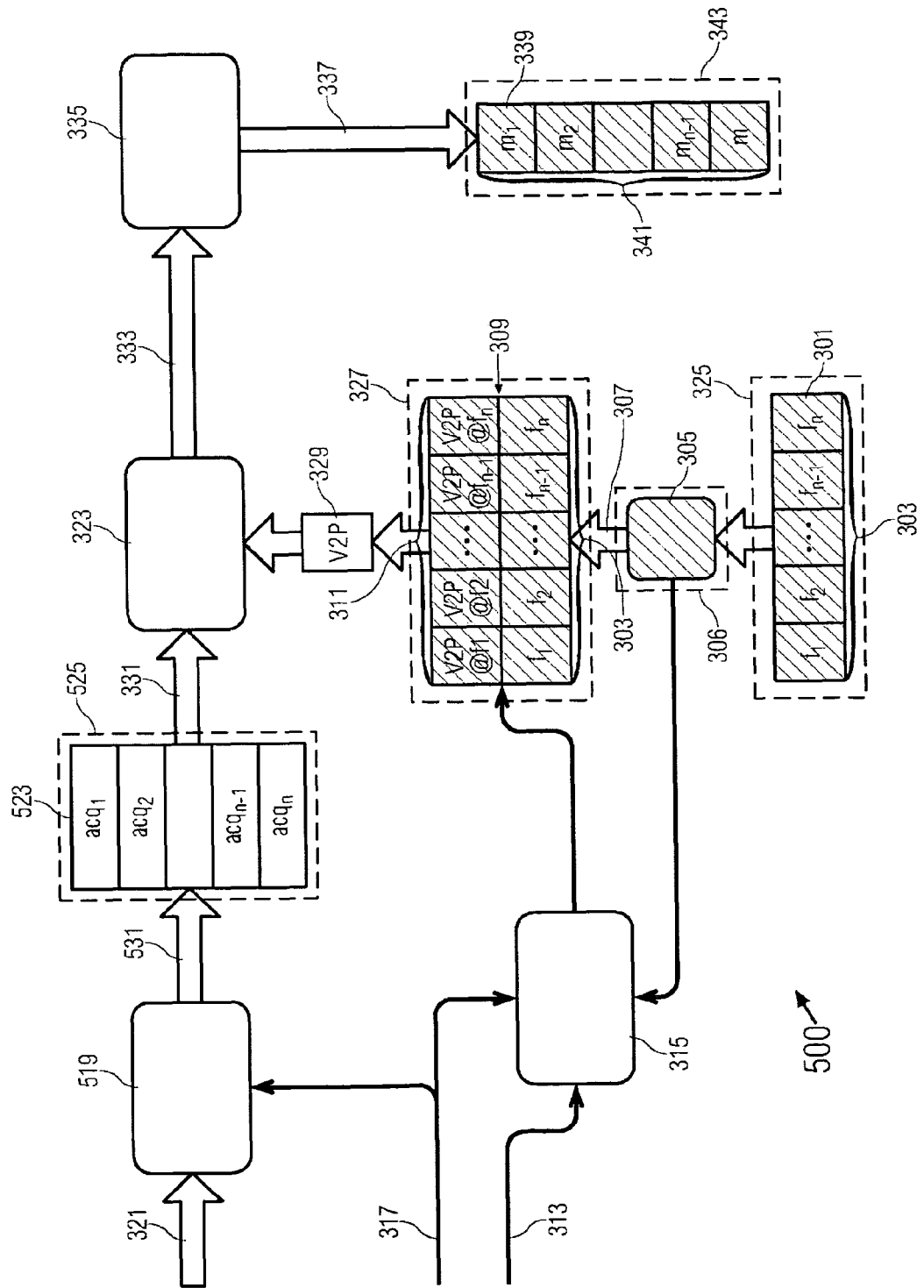
FIG. 5 is a diagrammatic block diagram showing a power measurement system having fast correction of power measurements of another embodiment of the present invention.

FIG. 5 is a diagrammatic block diagram showing a power measurement system having fast correction of power measurements of an embodiment 500 of the present invention. The embodiment 500 of FIG. 5 is similar to the embodiment 300 of FIG. 3, except that it makes use of the "Method and Apparatus for Extracting Individual Pulses from an Input Signal" as described in US Patent Publication 2007/0001887A1 to Colin Johnstone and Eric Breakenridge published on Jan. 4, 2007 (hereafter referred to as "Johnstone and Breakenridge"), which is hereby incorporated by reference in its entirety into the present disclosure.

An acquisition block 519 uses the method of "Johnstone and Breakenridge" to capture or extract the raw samples 321 and send captured raw samples 531 to a frequency sequence acquisition table 523 stored in a buffer or computer readable media 525. The table 523 stores the captured raw samples 531 which are then passed to the correction block 323 as the samples 331 as is described in FIG. 3 with respect to the embodiment 300. In this way the samples for all the measurements are stored into memory before processing them.

The embodiment 500 is particularly useful for very fast frequency-hopping signals. For example where the signal is a burst of short frequency hopping pulses. In this case if each pulse were processed as it arrived, as in the embodiment 300, some of the pulses would be missed due to the processing time. In the embodiment 500, all the pulses in the burst can be captured and stored in the table 523 and then processed at the processing rate. There is then enough time to process the stored pulses before the arrival of the next burst.

The embodiment 500 has a rate of capture and acquisition of pulses dictated by the sample rate and memory size rather than the processing rate. Thus the embodiment 500 can keep pace with any pulse train that can be captured with the acquisition block 519. Again, the cross-hatched blocks in the diagram depict processing that is carried out the rate at which the correction transforms 311 can be selected and applied to the captured raw sample 331

In another embodiment, measurements of pulses are captured at the beginning, middle and end of the frequency hopping signal 200 and also from the lower, middle and upper frequency ends of the hopping band. Thus, instead of processing each and every pulse in the hop sequence, just a few are selected. For example one from the low frequency end of the hop sequence, one from the middle and one from the top. For example, in the frequency hopping signal 200 of FIG. 2, if there is a hop sequence of 200 frequencies, then the pulses 23, 67 and 197 might be selected as they are placed at the $1^{st}$, 100th and 200th frequencies.

The frequency sequence table 301 becomes a time frequency definition table and it selects not only the frequency of the pulse to be measured but also its position within the sequence. The table would store data indicating that pulse 23 is at frequency 1, pulse 67 at frequency 100 and pulse 197 at frequency 200.

In the foregoing specification, the invention has been described with reference to specific exemplary embodiments thereof. The specification and drawings are, accordingly, to be regarded in an illustrative sense rather than a restrictive sense.

The invention claimed is:

1. A method for correcting power measurements of a signal having a changing frequency comprising the steps of:
   acquiring samples of the signal;
   matching the samples of the signal to a sequence of frequencies indexed to correction transforms; and
   applying the correction transforms to the samples of the signal.

2. The method of claim 1, wherein the sequence of frequencies is the sequence of the frequencies of the hopping carrier frequency.

3. The method of claim 1, further comprising the step of storing the sequence of frequencies in a table.

4. The method of claim 1, further comprising the step of storing the correction transforms indexed to the sequence of frequencies in a table.

5. The method of claim 4, further comprising the step of generating the correction transforms based on the sequence of frequencies for storage in the table.

6. The method of claim 1, further comprising the step of providing a signal trigger to gate the measurement of the samples of the signal in synchronization with the applying of the correction transforms to the samples of the signal.

7. The method of claim 1, wherein the correction transforms are applied to the samples of the signal to produce corrected samples and further comprising the step of storing the corrected samples in the order of the sequence of frequencies.

8. The method of claim 1, wherein the sequence of frequencies are pre-determined and stored in a table to correspond to a known hopping sequence of the hopping carrier frequency.

9. The method of claim 1, wherein the samples of the signal are voltage samples and the correction transforms transform the voltage samples to power samples and correct for frequency errors.

10. An apparatus for correcting power measurements of a signal having a changing frequency comprising:
    a means for acquiring samples of the signal;
    a means for matching the samples of the signal to a sequence of frequencies indexed to correction transforms; and
    a means for applying the correction transforms to the samples of the signal.

11. The apparatus of claim 10, wherein the sequence of frequencies is the sequence of the frequencies of the hopping carrier frequency.

12. The apparatus of claim 10, further comprising a means for storing the correction transforms indexed to the sequence of frequencies in a table.

13. The apparatus of claim 12, further comprising a means for generating the correction transforms based on the sequence of frequencies for storage in the table.

14. The apparatus of claim 10, further comprising a gating means for receiving a signal trigger to gate the measurement of the samples of the signal in synchronization with the applying of the correction transforms to the samples of the signal.

15. The apparatus of claim 10, wherein the correction transforms are applied to the samples of the signal to produce corrected samples and further comprising a means for storing the corrected samples in the order of the sequence of frequencies.

16. An apparatus for correcting power measurements of a signal having a changing frequency comprising:
    an acquisition block for acquiring samples of the signal;
    a sequence controller for matching the samples of the signal to a sequence of frequencies indexed to correction transforms; and a correction block for applying the correction transforms to the samples of the signal.

17. The apparatus of claim 16, wherein the sequence of frequencies is the sequence of the frequencies of the hopping carrier frequency.

18. The apparatus of claim 16, wherein the correction transforms are applied to the samples of the signal to produce corrected samples and the corrected samples are stored in the order of the sequence of frequencies.

19. The apparatus of claim 16, wherein the sequence of frequencies are pre-determined and stored in a table to correspond to a known hopping sequence of the hopping carrier frequency.

20. The apparatus of claim 16, wherein the samples of the signal are voltage samples and the correction transforms transform the voltage samples to power samples and correct for frequency errors.

* * * * *